US005973733A

United States Patent [19]

Gove

[11] Patent Number: 5,973,733

[45] Date of Patent: Oct. 26, 1999

[54] VIDEO STABILIZATION SYSTEM AND METHOD

[75] Inventor: Robert J. Gove, Los Gatos, Calif.

[73] Assignee: Texas Instruments Incorporated, Dallas, Tex.

[21] Appl. No.: 08/707,045

[22] Filed: Aug. 30, 1996

Related U.S. Application Data

[63] Continuation of application No. 08/455,582, May 31, 1995, abandoned.

[51] Int. Cl.[6] .............................. H04N 5/228; H04N 5/14

[52] U.S. Cl. .......................... 348/208; 348/142; 348/155; 348/700

[58] Field of Search .................................... 348/135, 142, 348/143, 154, 155, 169, 207, 208, 699, 700; H04N 5/228

[56] References Cited

U.S. PATENT DOCUMENTS

| | | | |
|---|---|---|---|
| 4,494,140 | 1/1985 | Michael | 358/105 |
| 4,695,959 | 9/1987 | Lees et al. | 364/458 |
| 4,967,271 | 10/1990 | Campbell et al. | 358/105 |
| 5,047,850 | 9/1991 | Ishii et al. | 358/105 |
| 5,053,876 | 10/1991 | Blissett et al. | 358/222 |
| 5,067,019 | 11/1991 | Juday et al. | 358/160 |
| 5,099,323 | 3/1992 | Morimura et al. | 358/105 |
| 5,157,732 | 10/1992 | Ishii et al. | 382/1 |
| 5,189,518 | 2/1993 | Nishida | 358/222 |
| 5,208,667 | 5/1993 | Saunders | 358/140 |
| 5,259,040 | 11/1993 | Hanna | 382/41 |
| 5,267,034 | 11/1993 | Miyatake et al. | 358/105 |
| 5,278,663 | 1/1994 | Hong | 358/335 |
| 5,313,296 | 5/1994 | Ohki | 348/208 |
| 5,371,539 | 12/1994 | Okino et al. | 348/207 |
| 5,430,480 | 7/1995 | Allen et al. | 348/208 |
| 5,436,672 | 7/1995 | Medioni et al. | 348/591 |
| 5,438,357 | 8/1995 | McNelley | 348/15 |

OTHER PUBLICATIONS

Article, Hans Georg Musmann, Peter Pirsch and Hans Joachim Grallert, "Advanced in Picture Coding", Reprinted in *Proc. IEEE*. vol. 73. No. 4, pp.523–548, Apr. 1985.

Article, Shep Siegel, "VME Boards Warp Images at High Speeds", *ESD: The Electronics System Design Magazine*, pp 57–62, Nov. 1987.

Article, Robert J. Gove, Ph.D., "Real–Time 3D Object Tracking in a Rapid–Prototyping Environment", Published in *Electronic Imaging '88* International Electronic Imaging Exposition and Conference Session on Artificial Intelligent Technologies for Image Processing, Boston, Massachusetts, 7 pages, Oct. 4, 1988.

(List continued on next page.)

*Primary Examiner*—Andrew Faile
*Assistant Examiner*—Ngoc-Yen Vu
*Attorney, Agent, or Firm*—William B. Kempler; Warren L. Franz; Richard L. Donaldson

[57] ABSTRACT

A system (26) for stabilizing a video recording of a scene (20, 22, & 24) made with a video camera (34) is provided. The video recording may include video data (36) and audio (38) data. The system (26) may include source frame storage (64) for storing source video data (36) as a plurality of sequential frames. The system (26) may also include a processor (50) for detecting camera movement occurring during recording and for modifying the video data (36) to compensate for the camera movement. Additionally the system (26) may include destination frame storage (70) for storing the modified video data as plurality of sequential frames.

17 Claims, 6 Drawing Sheets

OTHER PUBLICATIONS

Article, Robert J. Gove "Architectures for Single–Chip Image Computing", Preprint from SPIE's Electronic Imaging Science & Technology Conference on Image Processing and Interchange, San Jose, CA., 12 pages Feb. 9–14, 1992.

Article, Karl Guttag, Jerry R. Van Aken, and Robert J. Gove, "A Single–Chip Multiprocessor for Multimedia: The MVP" *IEEE Computer Graphics & Applications*, pp. 53–64 Nov. 1992.

Article, Woobin Lee, Yongmin Kim, Jeremiah Golston, and Robert J. Gove, "Real–Time MPEG Video CODEC on a Single–Chip Multiprocessor", *SPIE Electronic Imaging*, San Jose California, 12 pages, Feb. 6–10, 1994.

Article, Woobin Lee, Yongmin Kim, and Robert J. Gove "Real–Time MPEG Video Compression Using the MVP", *IEEE Data Compression Conference*, Snowbird Utah, 2 pages, Mar. 28–31, 1994.

Article, Robert J. Gove, "The MVP: A Highly–Integrated Video Compression Chip", *IEEE Data Compression Conference*, Snowbird, Utah, 11 pages, Mar. 28–31, 1994.

Article, Robert J. Gove, "The MVP: A Single–Chip Multiprocessor for Image & Video Applications", Society for Information Display 1994 International Symposium, Seminar, Exhibition, San Jose, California, 5 pages, Jun. 12–17, 1994.

| | | | | | | | | | | | |
|---|---|---|---|---|---|---|---|---|---|---|---|
| add1 | add2 | add3 | add4 | add5 | add6 | • • • | addM | | | | |
| | in1 & | in2 & | in3 & | in4 & | in5 & | • • • | in M−1 & | inM & | | | |
| | | int1 | int2 | int3 | int4 | • • • | int M−2 | int M−1 | intM | | |
| | | | out1 & | out2 & | out3 & | • • • | out M−3 & | out M−2 & | out M−1 & | out M & | |
FIG. 9
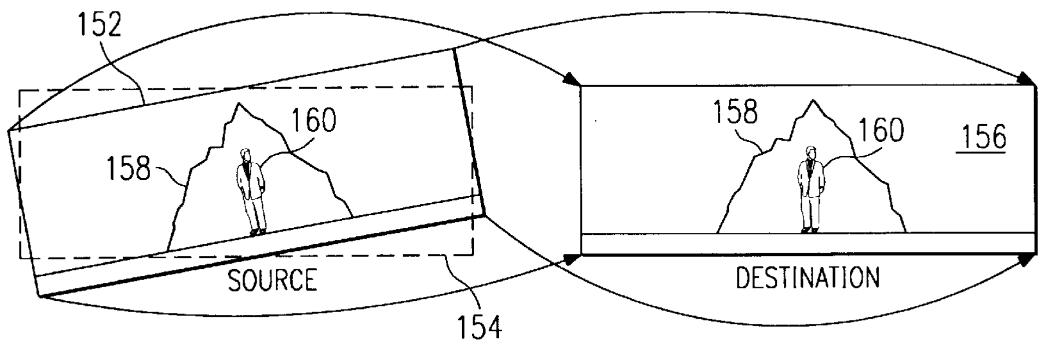
FIG. 10
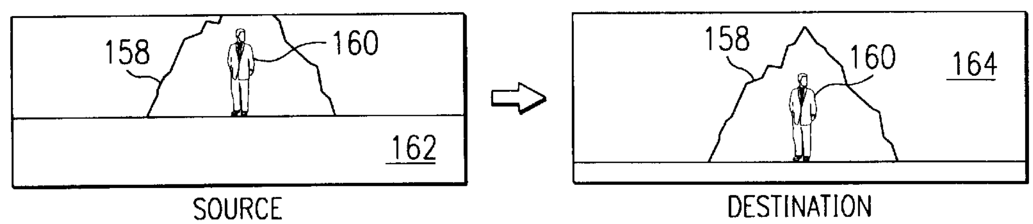
FIG. 11
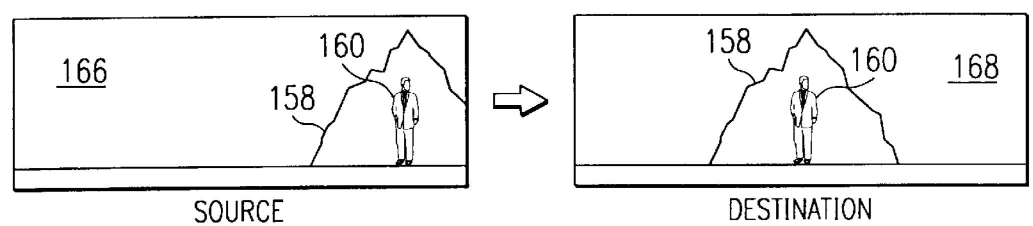
FIG. 12

VIDEO STABILIZATION SYSTEM AND METHOD

This application is a Continuation of application Ser. No. 08/455,582, filed May 31, 1995, now abandoned.

CROSS-REFERENCE TO RELATED APPLICATIONS

This application is related to U.S. patent application Ser. No. 08/382,274 entitled Smooth Panning Virtual Reality Display System, filed Jan. 31, 1995 of the same assignee, attorney docket number. TI-16702 (32350-1019).

TECHNICAL FIELD OF THE INVENTION

This invention relates in general to the field of video recordings, and more particularly to a system and method for stabilizing video recordings.

BACKGROUND OF THE INVENTION

The use of video recorders or cameras continues to grow in this country. Millions of people use their video cameras each day to capture personal events in their lives and sometimes, newsworthy events. Unfortunately, some video camera users have difficulties maintaining the camera stable during recording. This instability sometimes results in poor quality videos and can result in unwatchable videos. These problems may be exacerbated when the event being recorded contains action, such as a child's soccer game, or when the event is filmed under stress, such as when filming an accident.

One previous attempt to stabilize video recordings has been to stabilize the optics portion of the video camera. By providing the optics with the ability to float with respect to the remainder of the camera during movement of the camera, a more stable video recording can be captured. Unfortunately, optical solutions for stabilizing video recordings may be expensive. The hardware required to stabilize the optics may add significant costs to the camera, making the camera too expensive for large portions of the camera market.

Another prior approach to video stabilization has been to use a larger charged couple device (CCD) in the camera than is required to capture the scene being recorded. The portion of the CCD that is used to record a scene changes as required to stabilize the recording of the scene. For example, a sudden downward movement of the camera can be compensated for by changing the portion of the CCD used to capture the scene from the center portion to the top portion of the CCD. Changing the portion of the CCD used to capture a scene removes the camera movement from the recording. Unfortunately, a larger CCD and associated circuitry add costs to a video camera that may make the camera cost prohibitive for some users.

One shortcoming of known previously developed video stabilization techniques is that stabilization must be provided during recording. A need exists of techniques or systems that can stabilize a video recording after it has been made.

SUMMARY OF THE INVENTION

In accordance with the present invention, a video stabilization system and method are provided that substantially eliminate or reduce disadvantages and problems associated with previously developed video stabilization techniques.

One aspect of the present invention provides a method for stabilizing a video recording of a scene made with a video camera. The video recording may include video data and audio data. The method for stabilizing a video recording may include the steps of detecting camera movement occurring during recording and modifying the video data to compensate for the camera movement.

Another aspect of the present invention may include a system for stabilizing a video recording of a scene made with a video camera. The video recording may include video data and audio data. The system may include source frame storage for storing source video data as a plurality of sequential frames. The system may also include a processor for detecting camera movement occurring during recording and for modifying the video data to compensate for the camera movement. Additionally the system may include destination frame storage for storing the modified video data as plurality of sequential frames.

The present video stabilization system and method provide several technical advantages. One important technical advantage of the present invention is its ability to stabilize previously recorded video recordings. Millions of previously recorded video recordings can be stabilized with the present invention to enhance their quality. The present invention provides a relatively low cost solution for stabilizing video recordings in comparison with previously developed video stabilization techniques. The present invention can also be implemented in a video camera so that a video recording can be stabilized as it is made.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 9 provides pipelining of address generation, input packet requests, interpolation, and output packet requests for pipelined transfer processor operations of the multimedia video processor in accordance with the present invention; and FIGS. 10 through 12 illustrate the effects of stabilizing a scene in accordance with the present invention.

DETAILED DESCRIPTION OF THE INVENTION

Figure 1:
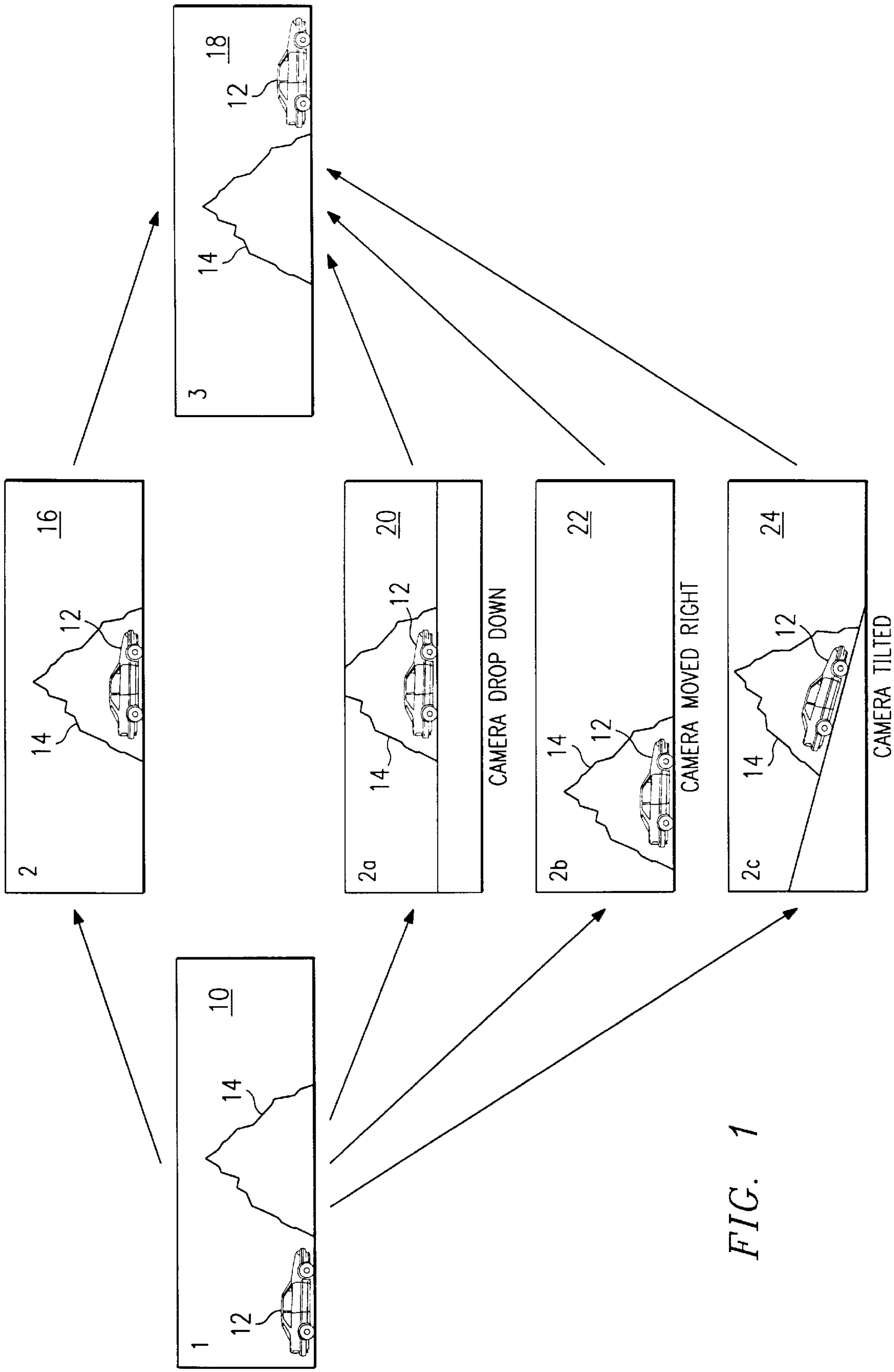
FIG. 1 illustrates several frames from a video recording and the results of several camera movements.

Preferred embodiments of the present invention are illustrated in the drawings, like numerals being used to refer to like and corresponding parts of various drawings.

FIG. 1 illustrates several frames from a video recording. Frame 1 includes scene 10 having vehicle 12 and mountain 14. In scene 10 vehicle 12 has not yet reached mountain 14. In frame 2 vehicle 12 is directly in front of mountain 14 in scene 16. In frame 3 containing scene 18, vehicle 12 has passed mountain 14. If the video camera recording frames 1 through 3 is held relatively stable, then vehicle 12 and mountain 14 retain their relative viewer-anticipated portions within each frame, and vehicle 12 moves logically across each scene with respect to mountain 14.

Frame 2*a* shows scene 20 and the results when the video camera recording scene 20 is moved downward. Downward movement of the video camera causes the top of mountain 14 to be cut off in frame 2*a*. Similarly, in frame 2*b* containing scene 22, moving the video camera to the right during recording shifts vehicle 12 and mountain 14 to the left within frame 2*b*. While vehicle 12 and mountain 14 are in alignment with one another in frame 2*a*, they are no longer centered within scene 22. Frame 2*c* includes scene 24 with vehicle 12 in alignment with mountain 14. Rotating the video camera during recording causes tilting of scene 24 in frame 2*c*.

Scenes 20, 22, and 24 in FIG. 1 illustrate how movement of a video camera during recording can sometimes distort or affect the quality and content of a recording.

The present invention provides a system and method for correcting the type of problems illustrated in frames 2*a*, 2*b*, and 2*c*.

Figure 2:
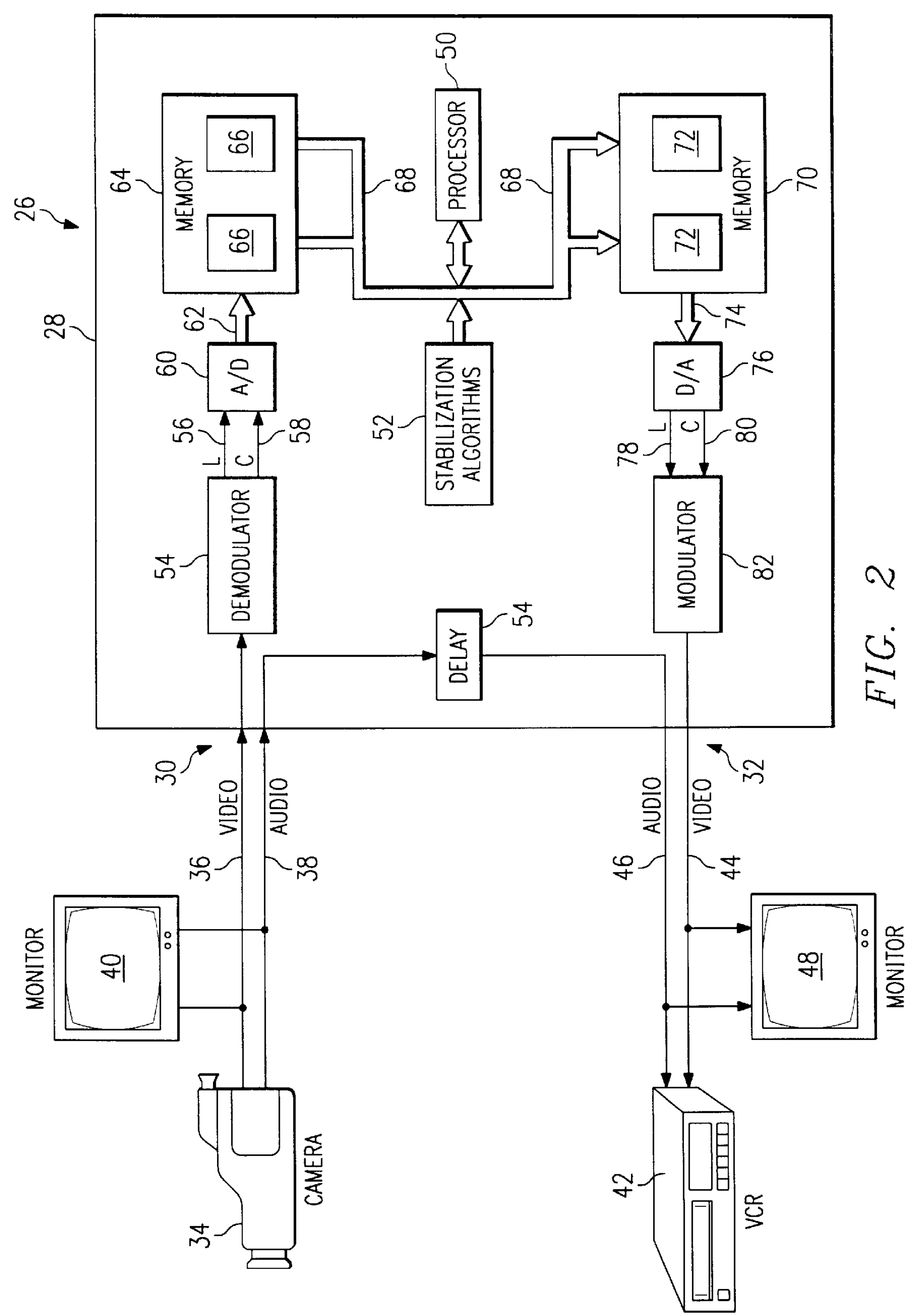
FIG. 2 is a schematic block diagram of an example embodiment for the present stabilization system.

FIG. 2 shows a schematic block diagram of video stabilization system 26. System 26 includes video stabilization circuitry 28 having input 30 and output 32. Input 30 to video stabilization circuitry 28 is provided by video source 34 that provides a video recording including source video signal 36 and source audio signal 38. Video source 34 may be embodied in a video camera as shown in FIG. 2 with playback capability or other video players, such as, for example, a video cassette recorder (VCR). Hereinafter, video source 34 will be referred to as video camera 34. This is not, however, intended in a limiting sense. Monitor 40 may also be included at input 30 so that the source video recording provided by video camera 34 may be monitored.

Coupled to output 32 of video stabilization circuitry 28 is video destination 42. In the preferred embodiment, video destination 42 is embodied in a VCR, and hereinafter VCR 42 shall be used when referring to video destination 42. VCR 42 receives destination video signal 44 and destination audio signal 46 at output 32 of video stabilization circuitry 28. Also coupled to output 32 of video stabilization circuitry 28 is monitor 48 that can be used to monitor the stabilized video recording from stabilization circuitry 28.

At the heart of video stabilization circuitry 28 is processor 50. Processor 50 may be embodied in any processor that can execute instructions at video rates.

In the preferred embodiment, processor 50 is the multimedia video processor (MVP) available from Texas Instruments Incorporated of Dallas, Tex. The MVP is also known in the field of video processors as the 340I or 340ISP processor. Processor 50 executes stabilization algorithms 52 when stabilizing video signals.

Video stabilization circuitry 28 receives source video signal 36 and source audio signal 38 at input 30. Audio signal 38 received at input 30 is provided to delay circuitry 54. It may be appropriate to delay the audio signal of a video recording while the video signal is processed, and delay circuitry 54 provides the necessary delay to the audio signal while its associated video signal is processed in video stabilization circuitry 28. Once the video signal has been corrected, audio 46 and video 44 signals are synchronized at output 32 of video stabilization circuitry 28. Delay of audio signal 46 and synchronization with video signal 44 at output 32 are accomplished in system 26 by techniques that are well known in the art and need not be described for understanding the novelty of the present invention.

Video signal 36 received at input 30 of video stabilization circuitry 28 is provided to demodulator 54. Demodulator 54 may split video signal 54 into its luminescence (L) signal 56 and chrominence (c) signal 58 components by techniques that are well known in the art. L signal 56 and C signal 58 are provided to analog-to-digital converter 60 where the signals are converted to digital signals. Analog-to-digital converter 60 is generally embodied in a high speed video rate converter. It is noted that if video camera 34 provides a digital video recording then converter 60 can be eliminated from circuitry 28.

Digital signals 62 are provided to source frame memory 64. Source frame memory 64 generally includes multiple random access memories (RAM) 66. In the preferred embodiment, RAMs 66 are embodied in video RAMs or VRAMS. Digital video signals 62 are stored in VRAMs 66 in a frame scheme as is known in the art. Frame-to-frame organization of video signals 62 are, therefore, maintained within source frame memory 64.

Source video frame data is then provided on data bus 68 to processor 50. Processor 50 executes stabilization algorithms 52 and stabilizes the video signal as required. Additional detail on stabilization algorithms 52 executed by processor 50 will be provided hereinafter. The stabilized video frame data is provided by processor 50 on data bus 68 to destination frame memory 70.

Destination frame memory 70 includes multiple VRAMs 72 for storing the stabilized video data in frame format. Stabilized destination video frame data 74 is provided to digital-to-analog converter 76 that is generally a high-speed video rate digital-to-analog converter. Digital-to-analog converter 76 provides analog stabilized L signal 78 and C signal 80 to modulator 82. Modulator 82 combines L signal 78 and C signal 80 by techniques that are well known in the art and provides stabilized destination video signal 44 at output 32.

As previously noted, video signal 44 and audio signal 46 are synchronized at output 32 as a stabilized video recording. This stabilized video recording may be stored on a video cassette by VCR 42. It is noted that if VCR 42 can store video signal 44 in digital format then digital-to-analog converter 76 in video stabilization circuitry 28 can be eliminated.

Monitors 40 and 48 allow for monitoring source video 36 and audio 38 signals as well as stabilized destination video signal 44 and audio signal 46. It is noted that a single monitor can be used to monitor either input 30 or output 32 to circuitry 28. Additionally, a single monitor having split-screen capability can be used so that input 30 and output 32 to video stabilization circuitry 28 can be viewed simultaneously.

Video stabilization system 26 in FIG. 2 provides several technical advantages. Video stabilization system 26 can stabilize previously recorded video recordings. By stabilizing previously recorded videos, the quality of the videos are improved. Additionally, since system 26 makes use of relatively low cost standard equipment, such as video camera 34 at input 30 and VCR 42 at output 32, it has relatively low capital cost. Additionally, video stabilization circuitry 28 can be implemented in a video camera so that a video recording can be stabilized as it is made.

Figure 3:
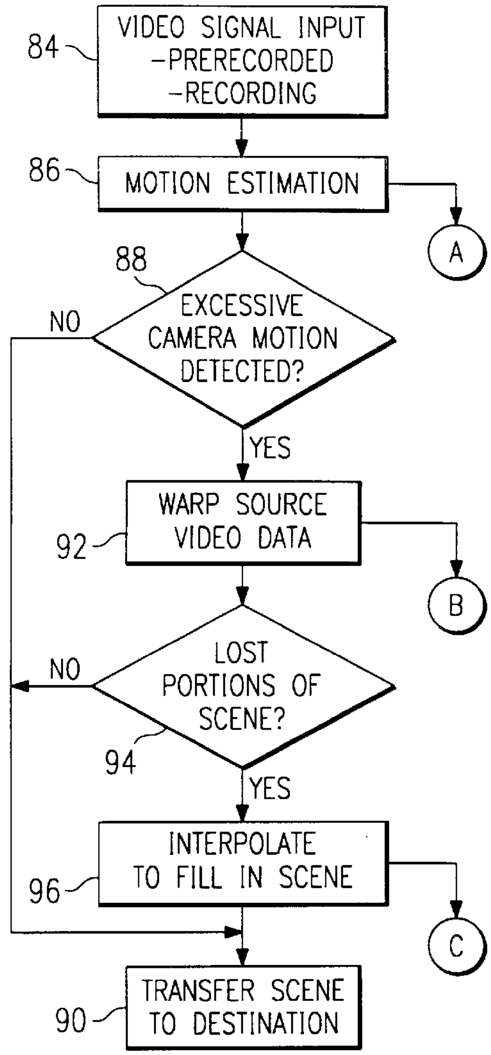
FIG. 3 provides a top level flow chart for a method for stabilizing a video recording in accordance with the present invention.

FIG. 3 provides an exemplary flow chart for stabilization algorithms 52 executed by processor 50 in video stabilization system 26. At step 84, source video frame data is received at processor 50 after being separated into L signal 56 and C signal 58, digitized, and stored in source frame memory 64. Processor 50 receives the video data from source frame memory 64 in a frame-to-frame format. Video data may be received at processor 50 while the video recording is being made or from a prerecorded source as previously described.

Continuing with the flow chart in FIG. 3, at step 86 processor 50 executes an algorithm or algorithms for detecting motion of the camera. This motion detection process may be generally referred to as motion estimation. Additional detail on motion estimation will be provided hereinafter. Basically, during motion estimation step 86, the source video frame data is analyzed to determine whether the camera has been moved. Motion estimation step 86 can discern whether a change in a scene over a sequence of frames is due to objects moving in the scene or if the changes are due to panning, zooming, rotating, or any other movement of the video camera. Camera movement due to shaking or oscillation of the person's hand during recording is an example of the type of motion that should be detected at motion estimation step 86.

Once motion estimation at step 86 is completed, then at step 88 processor 50 uses the motion estimation results to determine whether excessive camera motion requiring correction occurred during recording. Examples of the type of excessive camera movement that should be detected by processor 50 at step 86 was described in discussions relating to FIG. 1. If the response to the query made at step 88 is no, then processor 50 proceeds to step 90 where the source frame data in source frame memory 64 is transferred to destination frame memory 70 without correction.

Returning to step 88, if excessive camera motion is detected by processor 50 during motion estimation step 86, then the flow proceeds to step 92 where warping of the source video data is performed. Additional detail on warping step 92 will be described hereinafter, but basically, processor 50 can modify source frame data as necessary by remapping a scene or image to a stabilized format so as to eliminate the apparent movement of the video camera from the scene. Warping results in destination frame data that provides the stabilized video recording.

Once warping step 92 is completed, another query may be made at step 94 as to whether the excessive video camera movement has caused a portion of the recorded scene to be lost. An example of this is provided in scene 20 of frame 2*a* in FIG. 1 where a sudden downward movement of the video camera has resulted in the loss of the top of mountain 14 from scene 20. If no portion of the scene has been lost, then the flow proceeds to scene 90, where the warped video data is stored in destination frame memory 70. If, however, processor 50 determines that a portion of a scene has been lost, then at step 96 interpolation is performed to provide the lost data. Interpolation step 96 will be discussed in more detail hereinafter, but basically it fills in missing scene information by using prior or subsequent scene data. Once the missing portions of a scene are completed or "filled-in" through interpolation, the stabilized scene is transferred to destination frame memory 70. It is noted that warping step 92 and interpolation step 96 may be performed as a single step and need not be executed separately.

By the method described in FIG. 3, video data can be modified to stabilize the video recording. By warping or interpolating the video data, excessive camera movement that otherwise hinders a recording's quality can be corrected.

Figure 4:
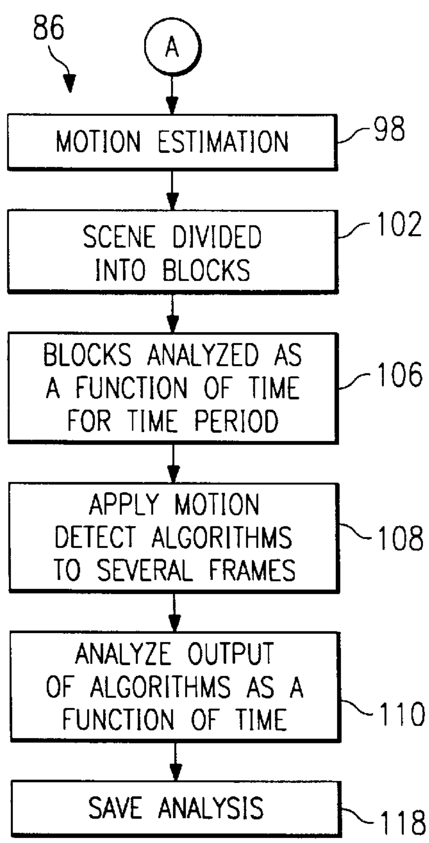
FIG. 4 is a flow chart for motion estimation in accordance with the present system and method.

FIG. 4 provides additional detail on motion estimation step 86 in FIG. 3. Motion estimation or detection determines whether video camera movement causes a change to a scene or whether the objects in the scene have moved. Motion estimation step 86 detects video camera movement like those described in discussions relating to FIG. 1 so that they may be corrected while movement in the scene is left unchanged. Additionally, the results of motion estimation step 86 may provide the initial inputs or boundaries for either warping or interpolating video data when stabilization is required.

Motion estimation step 86 is initiated at step 98 when source frame data from source frame memory 64 is retrieved on bus 68 to processor 50. There are several motion estimation algorithms that may be executed by processor 50 to detect motion in a video recording. A summary of several motion estimation algorithms may be found in *Advances in Picture Coding*, H. Musmann, et al., published in Proc. IEEE, volume 73, no. 4, pages 523–548, April, 1985, (Musmann). Musmann is expressly incorporated by reference for all purposes herein. A detailed description of the various motion estimation algorithms described in Musmann is not required to explain the novelty and operation of the present video stabilization system and method. An overview of one motion estimation technique will be described.

Figure 4A:
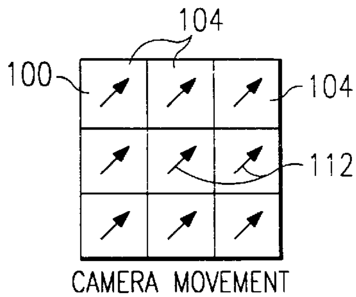
FIGS. 4A through 4C depict examples of the use of needle maps for detecting various types of motion in a video scene.

FIG. 4A shows frame 100 that may be analyzed for the presence of motion within the scene 100. At step 102 in FIG. 4 scene 100 is divided up into a series of blocks 104 as shown in FIG. 4A. The size and number of blocks 104 can be varied. The video data for each block 104 may be analyzed as function of time for several frames or for a time period at step 106. A motion detection algorithm like those described in Musmann is applied at step 108 to determine whether there is movement within blocks 104 of scene 100. Pel recursion, block matching correlation, or optical flow techniques are examples of motion detection algorithms that may be used. Motion detection analysis may generate motion fields or vectors 112 defining the magnitude and direction of motion in each block 104 as shown in FIG. 4A. At step 110, an operation such as a Hough transform of vectors 112 can be performed to analyze the results of the motion estimation algorithms to determine whether there is camera motion or motion in scene 100. Additionally, scene contacts may be used to detect motion in the scene opposed to motion of the scene.

In FIG. 4A, vectors 112 are all pointed in the same direction. This would indicate that either the scene being recorded contains motion in the direction of vectors 112 or that the video camera that made or making the recording moved in the direction opposite vectors 112. To determine whether objects in a scene are moving or whether the video camera has been moved, processor 50 compares the vectors for each frame or set of frames to the vectors for the frame or set of frames just prior to or after the present frame. The motion estimation can operate on a reduced pixel rate, such as odd field only, every other line, although a 30 Hz frame rate should be preserved to detect motion. If the frames just prior to and after the present frame have similar vectors 112, then processor 50 determines that the objects in the scene are moving. But if, for example, the previous frame had motion vectors that were in a direction different to those of FIG. 4A, then processor 50 discerns that the video camera has moved in a sudden or excessive manner and that some correction for the movement may be required. By analyzing the output of the motion estimation algorithms over a period of time, processor 50 can determine whether motion in a scene is a result of movement within the scene, e.g., car 12 moving across the frames in FIG. 1, or whether the video camera moved excessively thereby distorting the video recording.

Figure 4B:
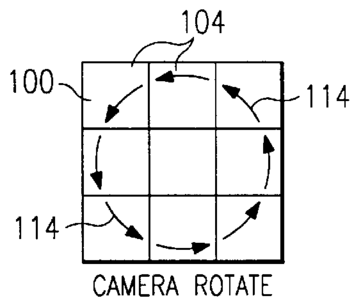
Figure 4C:
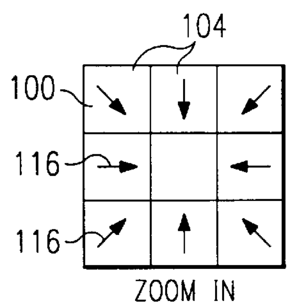

FIG. 4B illustrates another example of motion vectors 114 being used to detect movement of the video camera. Vectors 114 in FIG. 4B essentially form a circle. Motion vector mapping of this type would indicate that the video camera was rotated clockwise during recording. Rotation of the camera is thereby detected and corrected. FIG. 4C provides an example of motion vectors for scene 100 where all vectors 116 point to the center of frame 100. This would indicate that the video camera was zooming out on an object in the scene during recording. Vectors in an opposite direction to those depicted in FIG. 4C would indicate that the camera was zooming in when the recording was made. Depending on whether the zoom-in or zoom-out was made too fast, correction to the video data can be made in accordance with the present invention.

By applying a predetermined set of rules or heuristics on the results of the motion estimation analysis, processor 50 can determine whether undesirable or excessive camera movement occurred during recording of a frame or sequence of frames and whether correction for the camera movement is required. At step 118 the results of the motion estimation analysis may be saved as this analysis may be used in stabilizing the video recordings.

Figure 5:
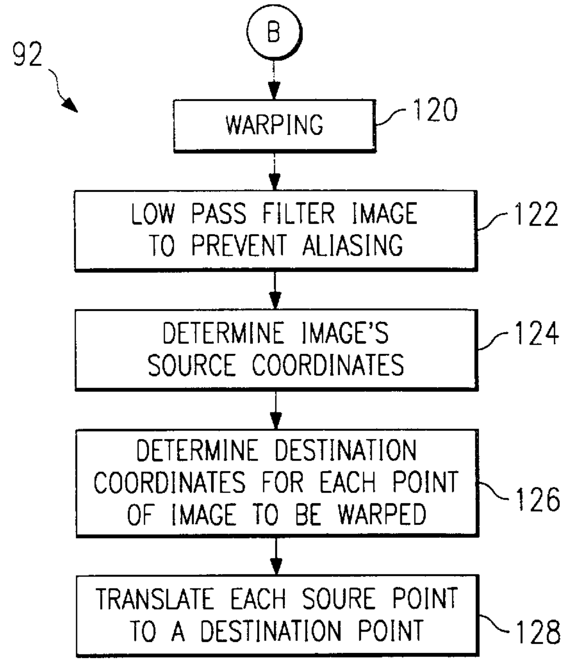
FIG. 5 is a flow chart for warping a scene in accordance with the present invention.

FIG. 5 provides additional detail on warping step 92 in FIG. 3. Processor 50 enters warping step 92 at step 120 when excessive camera movement is detected at step 88. Warping step 92 is basically remapping of the video frame data from its initial location in an original video scene to a new location in a destination or stabilized scene. Initially, the source frame data is low pass filtered at step 122 to prevent aliasing. At step 124, the source coordinates for the images in the scene are determined. These coordinates may be determined as part of the motion estimation process. At step 126, processor 50 determines a destination coordinate for each point of the image to be warped. At step 128, each source point of the image is translated to a destination point and stored in destination frame memory 70. By applying warping step 92, an image in a scene can be repositioned in a scene to its correct or true position thereby removing the effects of camera movement. It is noted that warping a scene can be done on a pixel by pixel basis, or by remapping rows horizontally and columns vertically.

An example of when warping in accordance with the present invention would be helpful is shown in FIG. 1. Scene 24 in frame 2*c* has the appearance of the car going downhill because the video camera was rotated or tilted during recording. By warping the data comprising frame 2*c*, scene 24 can be repositioned so that it looks like scene 18 in frame 3.

Sometimes warping of an image or scene is not sufficient to fully correct or stabilize the image. If part of the image is lost due to the camera movement, for example scenes 20 and 22 in FIG. 1, then it may be necessary to fill in or interpolate the missing information. If a portion of a scene is lost, then at step 94 in FIG. 3, processor 50 will perform an interpolation process at step 96.

Figure 6:
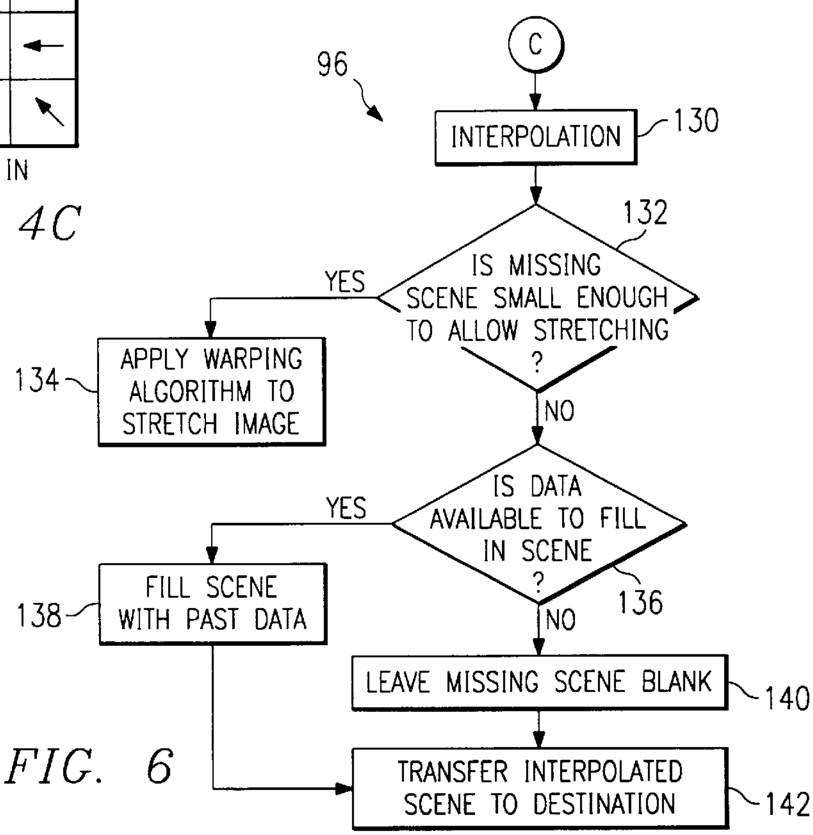
FIG. 6 is a flow chart for interpolation of a scene in accordance with the present system and method.

FIG. 6 provides a flow chart for interpolation step 96. Interpolation is entered at step 130 when the answer to query 94 in FIG. 3 is that a portion of the scene has been lost or must be filled in. The first query made during interpolation at step 132 is whether the missing scene information is small enough to allow stretching of the available scene data. This may be appropriate where only a small portion of the scene has been lost. If the answer is yes, then the flow proceeds to step 134 where the scene may be stretched by applying warping in accordance with the discussions relating to FIG. 5.

If the answer to the query at step 132 is no, then the flow proceeds to step 136 where a query is made as to whether prior frame data is available to fill in the scene. Because source frame memory 64 and destination frame memory 70 can store several frames of video data at a time, it may be possible to fill in a portion of a frame with data from other frames, either prior or future frames. For example, it may be possible to fill in the top of mountain 14 in FIG. 1, frame 2*a*, with a previous frame's data that included the data for the top of mountain 14. Alternatively, if a frame that followed frame 2*a* included the data for the top of mountain 14, then the subsequent data could be used to fill in the frame. If data is available, then the flow proceeds to step 138, where the missing portion of the frame is filled in with prior frame data. If the answer to the query at step 136 is no, then the missing scene information may be left blank at step 140. At step 142, the interpolated scene data is transferred by processor 50 to destination frame memory 70. By this way, the missing scene information may be filled in by interpolation.

Figure 7A:
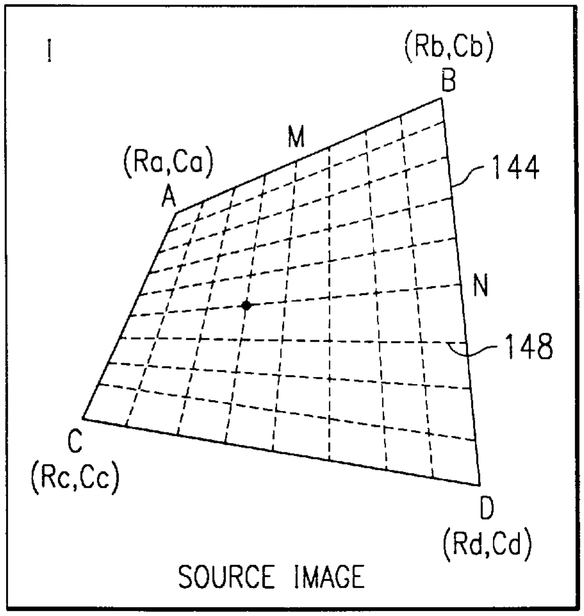
FIGS. 7A and 7B illustrate warping an image.
Figure 7B:
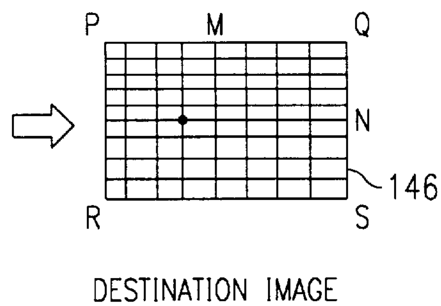

An additional example on warping and interpolation will now be described in connection with processor 50 embodied in an MVP device from Texas Instruments, Incorporated. FIG. 7A illustrates the warping process where quadrilateral region 144 is the input image (I) for mapping into rectangular region 146 in FIG. 7B or vice versa. FIG. 7A outlines the warping technique, where ABCD quadrilateral region 144 containing source image I is mapped into rectangular region 146 having a length of M pixels and a width of N pixels. Mapping or warping is accomplished by sampling ABCD quadrilateral region 144 at MN locations (the intersection of dashed lines 148 in quadrilateral region 144) and placing the results into rectangular region 146. The basic warping process can be divided into three steps.

First, the input image should be conditioned. One type of conditioning involves low pass filtering to prevent aliasing (step 122 in FIG. 5) if the sampling in quadrilateral region 144 is to be by subsampling. The size of the antialiasing filters will depend on the sample location. This should be obvious from FIG. 7A, where the samples are spaced farthest apart towards corner D than at corner A of quadrilateral region 144. The input image may also be conditioned to eliminate noise that may be in the scene containing the image. Noise in the scene may be the result of, for example, frame-to-frame noise, illumination, or brightness.

Next, the destination location or address for each sample point in image I is determined for rectangle PQRS in region 146. Each intersection of dotted lines 148 in quadrilateral ABCD in FIG. 7A is assigned an address.

Next, since typically each location in the source image will not align with the coordinates established for the destination image, an interpolation step is used to estimate the intensity of the image at the locations in the destination image based on the intensities at the surrounding integer locations. In some warping implementations, a two-by-two patch of the source image (that encloses a sample point) is used for interpolation. The interpolation used is bilinear as will be discussed hereinafter.

The MVP from Texas Instruments Incorporated is a single chip parallel processor. It has a 32-bit RISC master processor (MP), one to four DSP-like parallel processors (PP), and a 64-bit transfer processor (TP). The system operates in either a Multiple Instruction Multiple Data (MIMD) mode or an S-MIMD (synchronized MIMD) mode. It is expected that the present stabilization signal processing algorithms will be implemented on a parallel processor. These algorithms include, for example, fast fourier transforms (FFTs), discrete fourier transform (DFT), warp, interpolation, and conditioning, all stored as stabilization algorithms 52 of video stabilization circuitry 28. Each parallel processor in the MVP is a highly parallel DSP-like processor that has a program flow control unit, a load/store address generation unit, and an arithmetic and logic unit (ALU). There is parallelism within each unit, for example, the ALU can do a multiply, shift, and add on multiple pixels in a single cycle.

On-chip to off-chip (and vice versa) data transfers are handled by the transfer processor. The parallel processors and the master processor submit transfer instructions to the transfer processor in the form of length, list, packet requests. The transfer processor executes the packet request, taking care of the data transfer in the background. Input packet requests move data from off-chip to a cross-bar memory included with the MVP and output packet request from the cross-bar to off-chip. Different formats for data transfer are supported.

Two types of packet requests may be used with the warping algorithm. The first one is a fixed-patch-offset-guided to dimensional and the second is a dimensioned-to-dimensioned packet request. For the first type of request mode, two-by-two patches of the image at each sample location are transferred into a contiguous block in the cross-bar memory. A guide table specifies the relative address locations of the patches. In the second type of request mode, a contiguous block of interpolated intensity values is transferred from the cross-bar memory to off-chip memory.

When a single parallel processor is used to execute the warping algorithm, the input image I is processed one line at a time. Additionally, input image I is processed in four stages. During the first stage, addresses are generated for each sample point along the line. The second stage involves input packet requests to transfer two-by-two patches at each sample point on the line to the cross-bar memory. In the third stage, a bilinear interpolation of the pixel values within each two-by-two patch is made. Finally, in the fourth stage, an output packet request to transfer the interpolated values to the cross-bar to off-chip memory is accomplished. Additional detail for some of the stages will now be provided.

During address generation for each line in the image, an increment along the rows and the columns (slope) is first determined. This requires two divides of Q16 (16 fraction bits) numbers. An iterative subtraction technique based on the divi instruction is used. These 32 divi instructions are required (for each divide) to determine the slope with Q16 precision. An alternative implementation would be to use the master processor's floating point unit for fast division.

To explain why 16-bit precision may be chosen to represent the fractional part of the coordinates of the sample points and their increments, consider the general case where b bits are used to represent the fractional part of the addresses and the address increments. In 2's complement arithmetic, the error in the representation due to truncation is bounded as:

$$-2^{-b} \leq E_T \leq 0$$

Since M pixels are sampled along each line, the error in the location of the Mth pixel could be as much as:

$$M \times 2^{-b}$$

So when $M=2^b$, the last location could be in error by one pixel. By using a fractional precision of 16 bits (b=16) for the address and its increment, and since typical input and output images are less than 1024×1024, the maximum possible error is $1024 \times 2^{-16}=0.015625$ pixel locations (in the X and Y directions).

For each line a guide table (for input packet requests) and a fraction table (for interpolation) are generated. The guide table lists the relative address location of each two-by-two patch surrounding the sample point. The fraction table specifies the distance of the sample point from the top left pixel in the two-by-two patch (Fr and Fc in FIG. 8). The guide table is used in the fixed patch offset guided two-dimensioned packet request mode to provide the relative addresses of the two-by-two patches along the line. The fraction table is used in interpolation.

Figure 8:
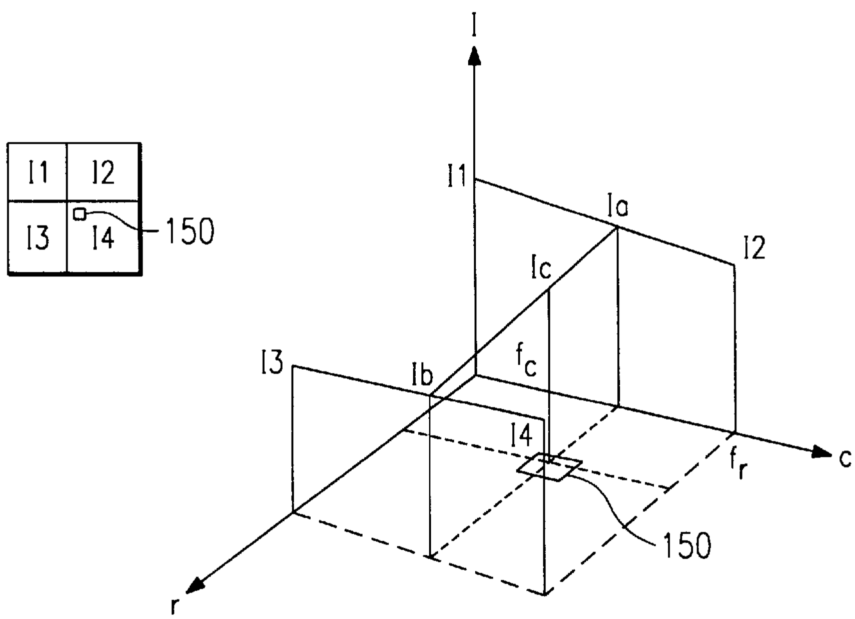
FIG. 8 illustrates bilinear interpolation of an image.

A bilinear interpolation process may be used to implement interpolation. First a local two-by-two neighborhood around a sample location in the source image is obtained. The bilinear interpolation process can then estimate the true pixel intensity. This is illustrated in FIG. 8, where sample location 150 is within a two-by-two neighborhood of pixels with intensities I1, I2, I3, and I4. In bilinear interpolation, pixel intensities may first be interpolated along the columns in accordance with the following:

$$Ia=I1+((I2-I1)*Fc)>>8$$

$$Ib=I3+((I4-I3)*Fc)>>8$$

Fc is in Q8 format, so after multiplying it with the intensity difference (Q0) the result is also Q8. The result is right shifted (>>) with sign extension by 8 bits to bring it back to Q0 format (truncation). The intensities Ia and Ib are then interpolated along the row axis with:

$$Ic=Ia+((Ib-Ia)*Fc)>>8$$

The execution of the warping and interpolation algorithms when implemented on an MVP will now be described. In one implementation, address generation takes three cycles per pixel and the interpolation step takes six cycles per pixel. Tables 1 and 2 below show the actual assembly code for the tight loops.

TABLE 1

Address Generation
address generation

| multiply | alu | global address | local address |
|---|---|---|---|
| Off = Ri *u COLS | Fc = ealut (dummy,dC) | Fr = b1 dR | dR = &*R_base, R base+=Rh inc<<0 |
| | Off=Off+dC>>16 | dC=&*C_base, C base+=Ch inc<<0 | *F_ptr++=b Fc |
| | Ri=dr>>16 | *Off ptr++ = Off | *F ptr++=b Fr |

TABLE 2

Interpolation
bilinear interpolation

| multiply | alu | global address | local address |
|---|---|---|---|
| Ifb=Idb*fx | Ida=I2−I1 | *Ic ptr++=b Ic | |
| Ifa=Ida*fx | Ib=ealut(I3,Ifb) | | |
| | Ia=ealu(I1,Ifa\\d0,%d0) | I3=ub *I34 ptr++ | |
| | Idc=Ib−Ia | I4=ub *I34 ptr,I34 ptr+=3 | fy=ub *f ptr++ |
| Ifc=Idc*fy | Idb=I4−I3 | I1=ub *I12 ptr++ | |
| | Ic=ealu(Ia,Ifc\\d0,%d0) | I2=ub *I12 ptr,I12 ptr+=3 | fx=ub *f ptr++ |

As can be seen from the tables, four operations can be done in parallel: multiply, ALU, a global address operation, and a local address operation. Input packet requests can take two to four cycles, depending on whether the two-by-two patch is word-aligned or not. Output packet requests take ⅛ cycles per pixel (8 bytes are transferred in cycle of the transfer processor). Ignoring overhead, the computation takes approximately 13 cycles per pixel. If the transfer processor is used in the background, the algorithm will only take 9 cycles per pixel. For a 100×100 sampling of an image region and a 50 MHz clock rate, a total warp algorithm will take 1.8 milliseconds, again, ignoring overhead.

If the MVP is used with a pipelined transfer processor operation, the parallel processor submits packet requests (PRs) to the transfer processor as linked lists. The transfer processor then processes the packet requests in parallel. It is noted that this parallelism is not required. The parallel processor is put into a polling loop until the packet requests are completed. An alternate way is illustrated in FIG. 9 where the address generation: add1, add2, . . . add M; input: in1, in2, . . . inM &; interpolation: int1, int2, . . . inTM; and output: Out1, Out2, . . . outM & stages are pipelined. The numbers 1, 2, 3 . . . N, represent the N lines that are processed. The execution proceeds down along columns and then onto the next row. For example, the sequence of execution is add1, add2, in1 &, add3. The "&" at the end of the packet requests signifies that they are invoked on the transfer processor in the background, while the parallel processor proceeds to the next item in that column. Using this scheme, the number of cycles for processing a pixel can be brought from about 13 to 9.

Warping and interpolation algorithms may also be implemented using several parallel processors in the MVP. In the preferred approach, each parallel processor would process a subset of the lines that are to be sampled. For example, if 100 lines are desired in the output image, and four parallel processors are available, each parallel processor would process 25 lines. Ideally, the processing time is reduced by a factor of four with this approach. All four parallel processors, however, must use the same transfer processor for the input and output operations.

Since each parallel processor processes at the rate of 9 cycles per pixel, for N parallel processors, the processing rate is 9/N cycles per pixel. The transfer processor, on the other hand, transfers pixels at the rate of two to four cycles per pixel. The transfer processor, therefore, may be a bottleneck in a multiple parallel processor implementation, and at most three parallel processors (3 cycles per pixel) can be used effectively. In the special case where the slope of the lines and the input image region ABCD is small, a bounding box (a rectangular region spanning the line) can be transferred efficiently (this takes ⅛ cycles per pixel, while it takes two to four cycles per pixel for transferring patches along an inclined line, so one could transfer up to a 16 pixel wide block with this method). Alternatively, paging could be used. If the input region is small, the bounding box of the region can be transferred. Then only one input and output packet request is necessary.

FIG. 10 illustrates the stabilization of a video frame in accordance with the present system and method. In FIG. 10 source scene 152 has been skewed with respect to the normal scene 154. This can occur by, for example, tilting the video camera recording scene 152. Destination scene 158 shows the results of primarily a warping stabilization being performed on source scene 152. Mountain 158 and person 160 are corrected within destination scene 158 as if the video camera had been steady during recording of scene 156.

FIG. 11 includes source scene 162 having mountain 158 and person 160 and destination scene 164 following the stabilization of source scene 162. In order to fill in the missing portions of source scene 162, the present system and method would use the warping and interpolation processes described herein in order to fill in the missing parts of the scene when it generates destination scene 164.

FIG. 12 illustrates source scene 166 having mountain 158 and person 160 therein and corrected destination scene 168. Source scene 166 has been skewed due to the sudden movement of the recording camera to the left, thereby cutting off part of source scene 166. Using the interpolation and warping techniques previously described, mountain 158 and person 160 can be repositioned in destination scene 168 with the present system and method filling in the missing information. It is noted that the corrections provided in FIGS. 10, 11, and 12 are exemplary only of the types of stabilization that may be provided in accordance with the present invention.

In operation of the present invention, a prerecorded video recording may be processed by the stabilization system of the present invention to eliminate the effects of excessive camera movement during recording. Alternatively, the present invention can stabilize a video recording as it is made. The video recording is separated into its video and audio components. When necessary the video portion is digitized by an analog-to-digital converter and then stored in a source frame memory. A processor then executes video data manipulation algorithms in analyzing the video data. One of the algorithms determines whether motion in a scene is due to excessive camera movement. Once the processor determines that the camera experienced excessive movement during recording, the processor corrects the scene by warping and interpolating the scene. The stabilized video data is then stored in a destination frame memory. The corrected video data can then be converted back to analog format when necessary and recombined with the audio portion of the signal in a destination tape. By this way, video recordings can be stabilized.

The present invention provides several technical advantages. A primary technical advantage of the present system and method is that it can be used to stabilize previously recorded video recordings. Additionally, the present system can be implemented in a video camera so that video recordings are stabilized as they are made.

Although the present invention has been described in detail, it should be understood that various changes, substitutions, and alterations can be made hereto without departing from the spirit and scope of the invention as defined by the appended claims.

What is claimed is:

1. A method for stabilizing a video recording of a scene made with a video camera, comprising the steps of:

separating video data of the video recording into a plurality of frames;

dividing each frame into a plurality of blocks;

determining for each frame, a motion vector for each block representing direction and magnitude of motion in the block, said motion vectors being determined from a comparison of each block in a first one of the frames and a second one of the frames;

comparing the motion vectors for each block in one of the plurality of frames with the motion vectors for each block in another of the plurality of frames adjacent to the one frame; and detecting camera movement when the motion vectors for the one frame are different from motion vectors for an adjacent frame; and modifying the video data to compensate for the camera movement.

2. The method of claim 1 wherein the modifying step further comprises warping the video data to compensate for camera movement.

3. The method of claim 1 wherein the modifying step further comprises interpolating the video data to compensate for camera movement.

4. The method of claim 1 wherein the modifying step further comprises warping and interpolating the video data to compensate for camera movement.

5. The method of claim 1 wherein the modifying step further comprises warping the video data to compensate for camera movement, the warping step further comprising:

determining a source address for the video data;

determining a destination address for the video data; and translating the video data from the source address to the destination address.

6. The method of claim 1 wherein the modifying step further comprises interpolating the video data to compensate for camera movement, the interpolating step further comprising stretching the video data for the scene and filling in missing portions of the scene with one of prior and subsequent video data.

7. The method of claim 1 wherein the modifying step further comprises interpolating the video data to compensate for camera movement, the interpolating step further comprising:

stretching the video data for the scene; and filling in missing portions of the scene with one of prior and subsequent video data.

8. The method of claim 1 further comprising the steps of:

separating the video data from audio of the video recording data prior to the detecting step; and recombining the video data with the audio data after the modifying step.

9. The method of claim 1, further comprising the step of analyzing the motion vectors to detect rotation indicating camera movement prior to said modifying step.

10. The method of claim 1 further comprising the step of analyzing the motion vectors to detect excessive zoom, wherein said modifying step also compensates for excessive zoom.

11. A method for stabilizing a video recording of a scene made with a video camera, the video recording including video data and audio data, the method comprising the steps of:

separating the video data from the audio data;

detecting camera movement occurring during recording by, separating the video data into a plurality of frames, dividing each frame into a plurality of blocks, determining a motion vector for each block of each frame, the motion vector representing direction and magnitude in the block, said motion vectors being determined from a comparison of each block in a first one of the frames and a second one of the frames;

analyzing the motion vectors for each block over a plurality of frames; and determining camera movement when motion vectors for one frame in the plurality of frames are different from motion vectors for adjacent frames in the plurality of frames;

modifying the video data to compensate for the camera movement by warping the video data, the warping step further comprising the steps of, determining a source address for the video data, determining a destination address for the video data, and translating the video data from the source address to the destination address; and recombining the video data with the audio data after the modifying step.

12. The method of claim 11 wherein the modifying step further comprises interpolating the video data to compensate for camera movement, the interpolating step further comprising filling in missing portions of the scene with one of prior and subsequent video data.

13. The method of claim 12 wherein the modifying step further comprises interpolating the video data to compensate for camera movement, the interpolating step further comprising:

stretching the video data for the scene; and filling in missing portions of the scene with one of prior and subsequent video data.

14. A system for stabilizing a video recording of a scene made by a video camera comprising:

a source frame storage for storing a plurality of frames of video data of the video recording;

a processor coupled to said source frame storage for dividing each frame into a plurality of blocks and determining a motion vector for each block in said plurality of frames, said motion vectors being determined from a comparison of each block in a first one of said plurality of frames and a second one of said plurality of frames, said processor comparing motion vectors for each block in one of the plurality of frames with the motion vectors for each block in an adjacent frame, detecting camera movement when the motion vectors for the one frame are different from the motion vectors in the adjacent frame and modifying said video data to compensate for said camera movement.

15. The system of claim 14 further comprising a destination memory storage for storing the video data processed by said processor, said destination memory being distinct from said source frame storage.

16. The system of claim 14 wherein said video recording includes an audio signal and further comprising means for separating said audio signal from said video data prior to said video stabilization system, delaying said audio signal and synchronizing said delayed audio signal with said processed video data.

17. The system of claim 14 further comprising interpolating means for interpolating said video data to compensate for camera movement, said interpolating means filing in portions of the scene with portions of one of prior and subsequent video data.

* * * * *